United States Patent [19]

Sugawara et al.

[11] Patent Number: 4,926,839
[45] Date of Patent: May 22, 1990

[54] HOT AIR TYPE HEATER

[75] Inventors: Sakuo Sugawara; Masanori Hara; Takane Suzuki, all of Kamakura, Japan

[73] Assignee: Mitsubishi Denki Kabushiki Kaisha, Tokyo, Japan

[21] Appl. No.: 343,367

[22] Filed: Apr. 26, 1989

[30] Foreign Application Priority Data

| Apr. 28, 1988 | [JP] | Japan | 63-104148 |
| Apr. 28, 1988 | [JP] | Japan | 63-104150 |
| Apr. 28, 1988 | [JP] | Japan | 63-104149 |
| Apr. 28, 1988 | [JP] | Japan | 63-104147 |
| May 17, 1988 | [JP] | Japan | 63-118208 |

[51] Int. Cl.$^5$ ............................................. F24C 5/04
[52] U.S. Cl. ................................ 126/96; 126/116 A; 98/38.6; 236/78 B
[58] Field of Search ........... 126/96, 95, 116 A, 116 R, 126/84; 98/38.6; 236/78 B

[56] References Cited

U.S. PATENT DOCUMENTS

| 4,352,453 | 10/1982 | McNabney | 98/38.6 |
| 4,525,137 | 6/1985 | Timioka et al. | 126/96 |
| 4,561,422 | 12/1985 | Hara et al. | 126/110 R |
| 4,677,904 | 7/1987 | Natsumeda et al. | 98/38.6 |

FOREIGN PATENT DOCUMENTS

| 61533 | 5/1981 | Japan | 126/116 A |
| 6254 | 1/1982 | Japan | 126/96 |
| 58-102046 | 6/1983 | Japan |
| 62-56716 | 3/1987 | Japan |
| 62-189560 | 12/1987 | Japan |

Primary Examiner—James C. Yeung
Attorney, Agent, or Firm—Oblon, Spivak, McClelland, Maier & Neustadt

[57] ABSTRACT

A heater comprising a heater body containing a heating source; an air blower for forcibly blowing off heated air from the heater body into a room, the heated air being produced by heat-exchanging with the heating source; a first temperature detection element for detecting a temperature at an upper level in the room; a second temperature detection element for detecting a temperature at a lower level in the room; a sensation input means for enabling a user to input his or her sensation corresponding to an actual room temperature; means for determining heating capability of the heating source based on the difference between the temperature detected by the first temperature detection element and a first set temperature; means for changing the outlet area and/or the air volume of the heated air based on the difference between the temperature detected by the second temperature detection element and a second set temperature lower than the first set temperature to determine the blow-off speed and/or the air volume of the heated air; and a control means for changing the first set temperature and the second set temperature based on the input given through the sensation input means.

6 Claims, 11 Drawing Sheets

1

HOT AIR TYPE HEATER

BACKGROUND OF THE INVENTION

1. Field of the Invention

The present invention is concerned with the improvements in room temperature control apparatus in a heater wherein heated air is fed in forced convection in a room by an air blower.

2. Discussion of Background

The room temperature control in such type heater is generally carried out by use of one temperature detector which is arranged in the heater casing. The temperature control will be explained in reference to FIG. 9. FIG. 9 is an electrical circuit diagram of the room temperature control unit in a conventional heater. In FIG. 9, reference numeral 1 designates the heater, and reference numeral 2 designates a main switch. Reference numeral 3 designates the combustion chamber in the heater 1 where e.g. kerosene is burnt as fuel. Reference numeral 4 designates an air blower which is mounted on the rear side of the heater 1 to circulate in the room the heated air produced by the combustion in the combustion chamber 3. Reference numeral 5 designates a temperature detection element which is constituted by a thermistor or the like to detect a temperature in the room. Reference numeral 7 designates an A/D (analog/digital) converter which converts the present resistance value of the temperature detection element 5 in a digital value. Reference numeral 9 designates an operation switch which is used for a user to input his or her sensation to the temperature in the room at the present time. The operation switch is constituted by a "cold" button 19 switch which is depressed when the user feels cold, a "comfortable" button 20 switch which is depressed when the user feels comfortable, and a "hot" button 21 switch which is depressed when the user feels hot, as shown in FIG. 12. Reference numeral 10 designates a microcomputer which includes a set room temperature determining means and an air volume determining means. The microcomputer also includes an input circuit 11, a CPU 12, a memory 13 and an output circuit 14. The input circuit 11 receives the output from the operation switch 9 and a signal indicative of a room temperture through the A/D converter 7. The output circuit 14 transmits a signal to a heating capability control device 15 to control the combustion output of the combustion chamber 3 in the heater 1 (hereinafter, referred to as heating capability). The output circuit 14 also transmits a signal to an air blower control device 16 to control the air volume (revolution) of the air blower 4 of the heater 1.

Now, the operation of the heater will be explained in reference to FIG. 10. FIG. 10 is a flow chart including a program which is stored in the memory 13 of the microcomputer 10 and determines the set temperature, the heating capability and the air volume.

First, when the main switch 2 is turned on, the flow of FIG. 10 starts. When the user uses the heater 1 for the first time after having bought it, the heating operation starts targetting the set temperature which has been prestored in the memory 13 before shipment. After the user has used the heater once, the temperature which was detected by the temperature detection element 5 when the "comfortable" button 20 has been actuated at the time of the previous heating operation is stored in the memory 13 as a set temperature. At a Step S101, the room temperature Tr detected by the temperature detection element 5 is input. At a Step S102, it is checked whether the sensation input by the operation switch 9 is made or not. If affirmative, the process proceeds to a step S103. The Step S103 through a Step S106 are a flow as the set room temperature determining means. When the Step S102 finds that the user has not input his or her sensation, the flow of the Step S103–S106 is skipped, and the process proceeds to a flow of a Step S107 and the subsequent steps as the heating capability determining means and the air volume determining means. When the Step S103 judges that the sensation input selected by the user is "cold", the set room temperauture is reset to a value which is obtained by adding a° C. (e.g. 2° C.) to the present room temperature Tr to determine a new set room temperature Tc at the Step S104. When the Step S103 judges that the sensation input selected by the user is "hot" , the set room temperature is reset to a value obtained by substracting a° C. from the detected room temperature Tr to determine a new set room temperature Tc at the Step S106. When the Step S103 judges that the sensation input is "comfortable", the Step S105 makes the set room temperature equal to the detected room temperature Tr to determine a new set room temperature Tc. At a Step S107, the temperature difference $\Delta T$ between the new set room temperature Tc and the detected room temperature Tr is calculated. The heating output needed is determined at a Step S108, and the air volume is determined at a Step S109, thereby to carry out the heating operation. The heating capability is determined so that it is proportional to the temperature difference between the new set room temperature and the detected room temperature. For example, when the detected room temperature is higher than the set room temperature, the heater 1 is controlled to be turned off so as to make the room temperature equal to the set room temperature. The air volume is determined so that it is proportional to the heating capability as shown in FIG. 11. For example, the heater is controlled so that as the room temperature approaches the set room temperature, the air volume decreases. This is because uncomfortable air flow in the room is minimized, and because the outlet air temperature is kept constant. In this way, the temperature condition in the room is controlled so that the room temperature is made equal to the set room temperature while the heating capability and the air volume are changing.

The conventional heater carries out the room temperature control while it is resetting the set room temperature, and changes the heating output and the air volume according to the sensation input selected by the user as explained. The purpose of heaters is to allow a person in the room to feel comfortable. The sensation of a person in the room is mainly influenced by the temperature at his or her feet and the temperature at his or her head. The temperature distribution in the vertical direction in the room with a heater in it is formed so that the temperature at an upper portion of the room is higher and the temperature at a lower portion and on the floor of the room is lower depending on the specific gravity difference of air. The temperature distribution in the vertical direction is determined depending on agitation power caused by the air feed of the heater. That is to say, when the air volume is great, the variation in the temperature distribution is lower, whereas when the air volume is small, the variation in the temperature distribution is larger. In addition, the temperature distribution is also influenced by the temperature outside the room. That is to say, when the temperature outside increases, the variation in the temperature distribution is smaller, whereas when the temperature outside decreases, the variation in the temperature distribution is larger.

The air volume of the conventional heater is dependent on the heating capability, i.e. is determined to be dependent on the temperature difference between a detected room temperature and a set room temperature. This means that the air volume is controlled irrespectively of the difference between the temperatures at an upper level and at a lower level in the room which has the greatest influence to sensation of a person in the room. As a result, when the temperature outside the room has changed, or when the air volume has changed at the time of having input sensation or because of the change in the room temperature, a person in the room feels uncomfortable due to the changed temperature conditions around him or her.

SUMMARY OF THE INVENTION

It is an object of the present invention to eliminate the disadvantage of the conventional heater and to provide a new and improved heater capable of producing the optimum temperature conditions in a room as a person in the room desires.

The foregoing and the other object of the present invention have been attained by providing a heater comprising a heater body containing a heating source; an air blower for forcibly blowing off heated air from the heater body into a room, the heated air being produced by heat-exchanging with the heating source; a first temperature detection element for detecting a temperature at an upper level in the room; a second temperature detection element for detecting a temperature at a lower level in the room; a sensation input means for enabling a user to input his or her sensation corresponding to an actual room temperature; means for determining heating output of the heating source based on the difference between the temperature detected by the first temperature detection element and a first set room temperature; means for changing the outlet area and/or the air volume of the heated air based on the difference between the temperature detected by the second temperature detection element and a second set room temperature lower than the first set room temperature to determine the blow-off speed and/or the air volume of the heated air; and a control means for changing the first set room temperature and the second set room temperature based on the input given through the sensation input means.

The foregoing and the other object of the present invention has also been attained by providing a heater comprising a heater body containing a heating source; an air blower for forcibly blowing off heated air from the heater body into a room, the heated air being produced by heat-exchanging with the heating source; a first temperature detecting element for detecting a temperature at a lower level in the room; a second temperature detection element for detecting a temperature at an upper level in the room; a sensation input means for enabling a user to input his or her sensation corresponding to an actual room temperature; means for determining heating capability of the heating source based on the difference between the temperature detected by the first temperature detection element and a first set room temperature; means for determining the blow-off speed and/or the air volume of the heated air blown off by the air blower based on the temperature detected by the first temperature detection element, the first set room temperature, the temperature detected by the second temperature detection element and a second set room temperature higher than the first set room temperature thereby to match the second set temperature to the output of the second temperature detection element; and a control means for changing the first set room temperature and the second set room temperature based on the input given through the sensation input means.

The foregoing and the other object of the present invention has also been attained by providing a heater comprising a heater body containing a heating source; an air blower for forcibly blowing off heated air from the heater body into a room, the heated air being produced by heat-exchanging with the heating source; a first temperature detection element for detecting a temperature at a lower level in the room; a second temperature detection element for detecting a temperature at an upper level in the room; a sensation input means for enabling a user to input his or her sensation corresponding to an actual room temperature; means for determining heating capability of the heating source based on the difference between the temperature detected by the first temperature detection element and a first set room temperature; means for carrying out a fast air-feeding operation wherein the heated air is fed in a high speed blow-off by changing the outlet area and the air volume of it when the temperature detected by the first temperature detection element is lower than the first set room temperature by a predetermined value; means for carrying out the fast air-feeding operation when the temperature detected by the first temperature detection element is lower than the first set room temperature, the difference between both temperatures is in a predetermined range, and the temperature detected by the second detection temperature is lower than a second set room temperature; means for carrying out a slow air-feeding operation wherein the heated air is fed in a low speed blow-off by changing the outlet area and air volume of the heated air when the temperature detected by the first temperature detection element is lower than the first ser room temperature, the difference between both temperatures is in a predetermined range and the temperature detected by the second temperature detection element is higher than the second set room temperature; means for carrying out the slow air-feeding operation when the temperature detected by the first temperature detection element is higher than the first set room temperature; and a control means for changing the first set room temperature and the second set room temperature based on the input given through the sensation input means.

BRIEF DESCRIPTION OF THE DRAWINS

A more complete appreciation of the invention and many of the attendent advantages thereof will be readily obtained as the same becomes better understood by reference to the following detailed description when considered in connection with the accompanying drawings, wherein.

DESCRIPTION OF THE PREFERRED EMBODIMENT

Figure 1:
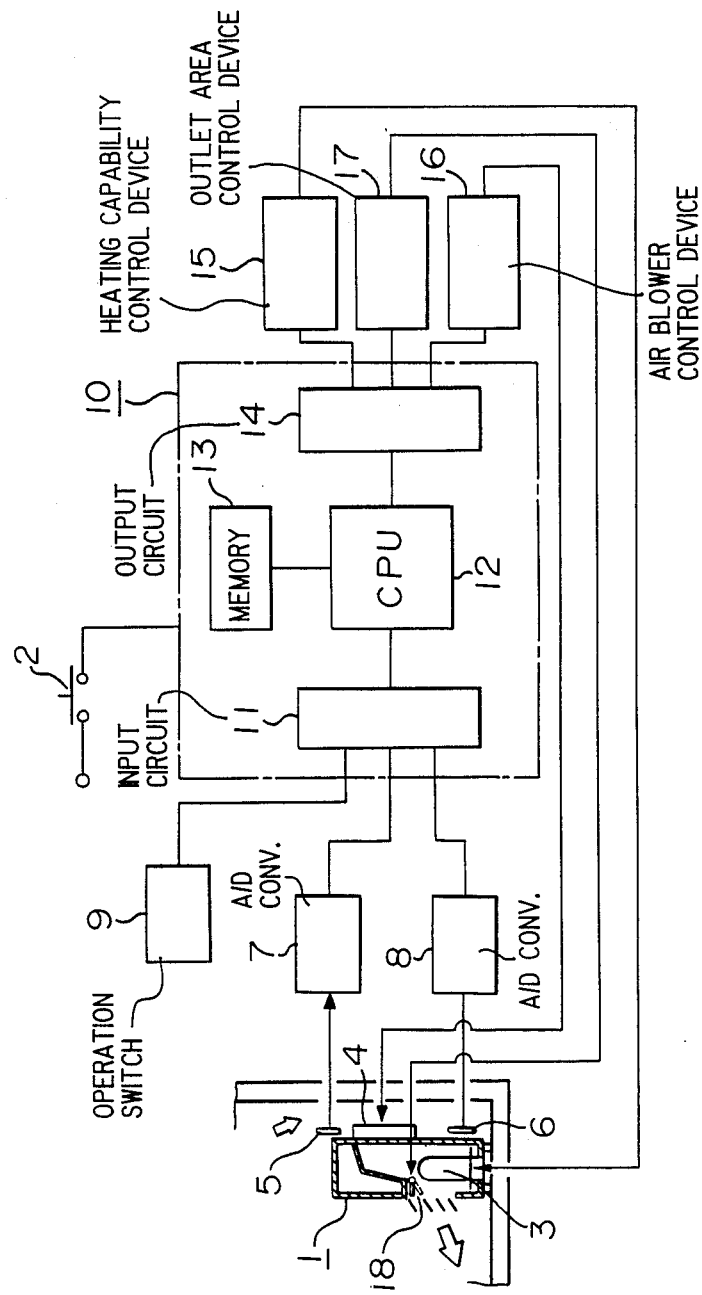
FIG. 1 is a schematic diagram of the electrical circuit of an embodiment of the heater according to the present invention.

Referring now to the drawing: wherein like reference numerals designate identical or corresponding parts throughout the several views, and more particularly to FIG. 1, there is shown a schematic diagram of the electrical circuit of an embodiment of the heater according to the present invention. In FIG. 1, the heater is constituted by a heater body 1, a main switch 2, a combustion chamber 3 which is arranged in the heater body 1 to burn kerosene as fuel, an air blower 4 which is mounted to the rear side of the heater body 1 to circulate heated air, a first temperature detection element 5 which is formed from a thermistor etc., and which is mounted on an upper portion of the heater body 1 to detect the temperature of air near the upper portion, and a second temperature detection element 6 which is forms a thermistor etc., and which is mounted on a lower portion of the heater body 1 to detect the temperature of air near the lower portion.

Figure 12:
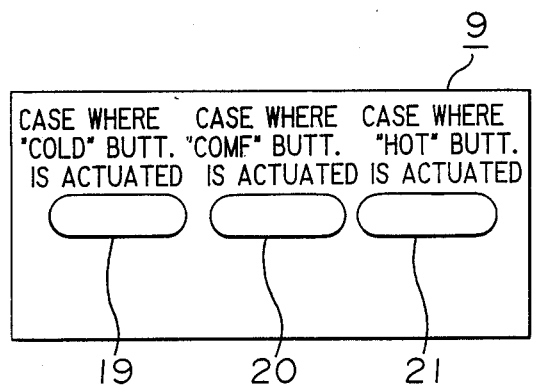
FIG. 12 is a front view of an operation switch used in the heater according to the present invention and the conventional heater.

Detailed measurement has confirmed that the temperature detected by the first temperature detection element 5 which is arranged at a position of 300 mm or more above the floor in height is related to the temperature of air at an upper level in the room, and that the temperature detected by the second temperature detection element 6 which is arranged at a position in the range of 30-150 mm above the floor in height is related to the temperature of air close to the floor of the room. This means that the temperature detected by the first temperature detection element 5 is the temperature at an upper level in the room, and that the temperature detected by the second temperature detection element 6 is the temperature at a lower level in the room. To the first temperature detection element 5 is connected an A/D (analog/digital) converter which converts the resistance value of the first temperature detection element into digital value. In addition, to the second temperature detection element 6 is connected an A/D (analog/digital) converter which converts the resistance value of the second temperature detection element into digital value. There is provided an operation switch 9 through which a user inputs his or her sensation to the actual temperature in the room. The operation switch is contituted by a "cold" button 19 which is actuated when the user feels cold, a "comfortable" button 20 which is actuated when the user feels comfortable, and "hot" button 21 which is actuated when the user feels hot as shown in FIG. 12 like the conventional heater. The heater according to the embodiment of the present invention is also provided with a microcomputer which has a set room temperature determining means, an air volume determining means and an outlet area determining means. The microcomputer includes input circuit 11, a CPU 12, a memory 13, and an output circuit 14. The input circuit 11 receives a signal indicative of the output of the operation switch 9, a signal indicative of the actual temperature at the upper level in the room through the A/D converter 7, and a signal indicative of the actual temperature at the lower level in the room through the A/D converter 8. The heater is also provided with a heating capability control device 15, an air blower control device 16, and an outlet area control device 17. The heating capability control device 15 controls the burning output of the combustion chamber 3, i.e. heating capability of the heater based on a signal from the output circuit 14. The air blower control device 16 controls the air volume (revolution) of the air blower 4 of the heater 1 based on a signal from the output circuit 14. The outlet area control device 17 controls based on a signal from the output circuit 14 an outlet area changing device 18 which is mounted at the outlet port of the heater 1.

For preparation for the first use of the heater 1 by the user, the set temperature for an upper level in the room (the first set temperature) and the set temperature for a lower level in the room (the second set temperature) are prestored in the memory 13 before shipment. After the user has used the heater 1 once, the temperatures which were detected by the first and temperature detection elements 5 and 6, respectively, are stored as a first and second set temperatures.

Figure 2:
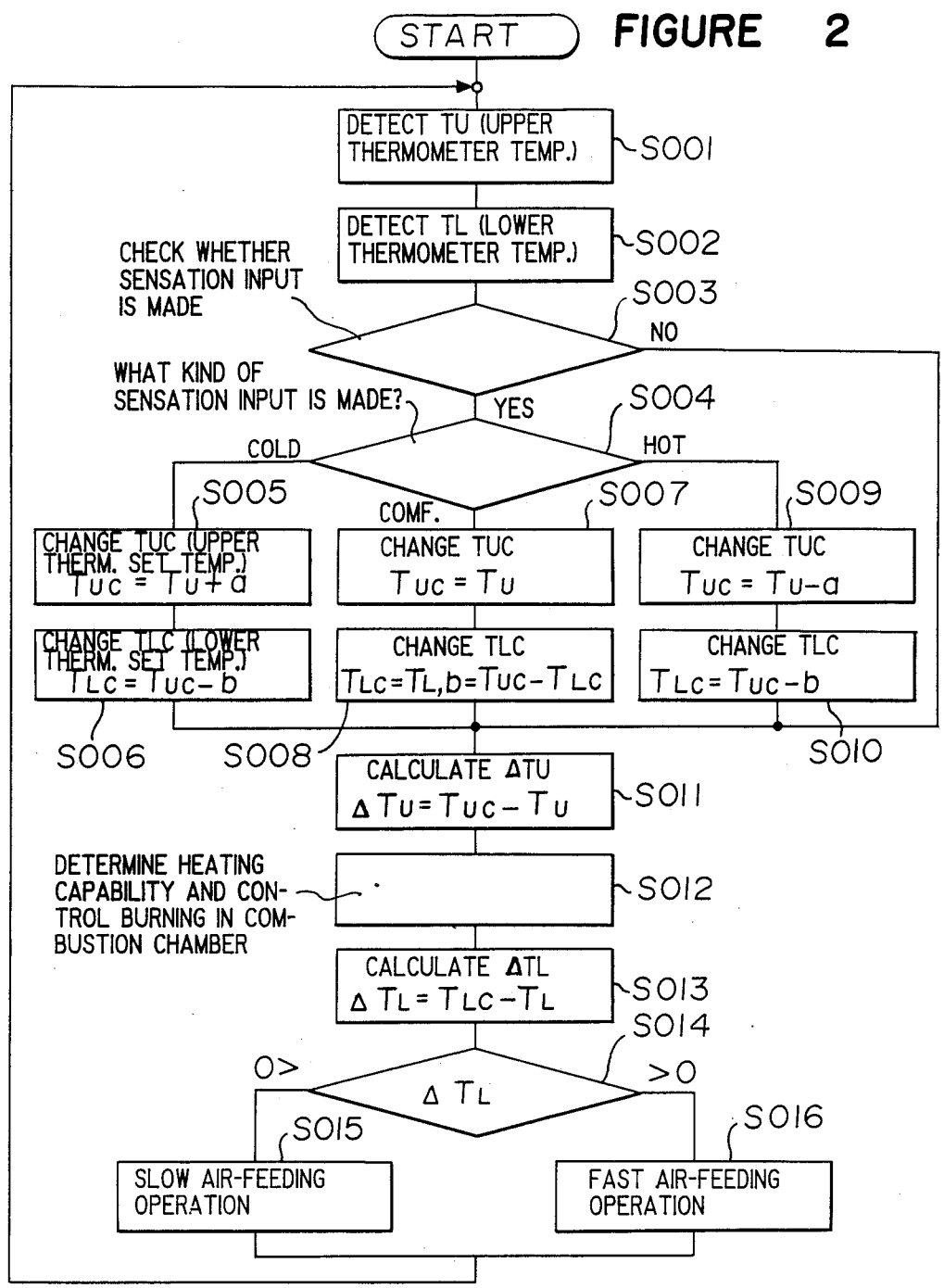
FIG. 2 is a flow chart showing the control process carried out in the electric circuit.

Now, the operation of the embodiment will be explained in reference to FIG. 2. FIG. 2 is a flow chart including a program which is stored in the memory 13 of the microcomputer 10 and which determines set room temperatures, heating capability, air volume and outlet area.

First, when the main switch is turned on, the flow of the FIG. 2 starts, targetting the first set temperature TUC and the second set temperature TLC which have been stored in the memory 13 before shipment when the user uses the heater 1 for the first time, or the first set temperature TUC and the second set temperature TLC which have been stored in the memory 13, respectively, in the same values as the temperatures detected by the first and second temperature detection elements 5 and 6 when the "comportable" button has been actuated at the time of the previous heating operation. At a Step S001, the first temperature detection element 5 detects the temperature TU at the upper portion of the heater 1. At a Step S002, the second temperature detection element 6 detects the temperature TL at the lower level of the heater 1. A Step S003 checks whether sensation input is made through the operation switch 9 or not. When the sensation input is made, the process proceeds to a Step S 004. The Step S004 through a Step S010 are a flow as the set room temperature determining means. When the Step S003 judges that no sensation input is made, the flow from the Step S004 to the Step S010 is skipped, and then the process proceeds to a flow of a Step S011 and the subsequent steps as the heating capability determining means, the air volume determining means and the outlet area determining means. The Step S004 judges what kind of sensation input is made. When the user feels the room temperature at that time is cold and actuates the "cold" button, the Step S005 determines a new first set room temperature TUC which is obtained by adding a° C. (e.g. 2° C.) to the temperature TU detected by the first temperature detection element 5. The Step S006 determines a new second set room temperature TLC which is obtained by substracting the temperature difference b between the previous first set room temperature and the previous second set room temperature from the new first set room temperature TUC. When the user actuates the "comfortable" button, the Step S007 determines a first set room temperature TUC which becomes equal to the temperature TU detected by the first temperature detection element at that time. The Step S008 sets a new second set room temperature TLC which is equal to the temperature TL detected by the second room temperature detection element at that time, and sets a new temperature difference b which is obtained by substracting the new second set room temperature TLC from the new first set room temperature TUC. When the user actuates the "hot" button, the Step S009 sets a new first set room temperature TUC which is obtained by substracting a° C. (e.g. 2° C.) from the temperature TU detected by the first temperature detection element at that time. The Step S010 sets a new second set room temperature TLC which is obtained by substracting the temperature difference b between the previous first set room temperature and the previous second set room temperature from the new first set room temperature TUC. The Step S011 calculates the temperature difference ΔTU between the new first set room temperature TUC and the temperature TU representative of an upper level in the room, which is obtained by substracting the temperature TU from the temperature TUC. The next Step S012 determines heating capability based on the calculated temperature difference ΔTU, and controls burning in the combustion chamber 3 according to the determined heating capability. The next Step S013 calculates the temperature difference ΔTL between the new second set room temperature TLC and the temperature TL representative of the temperature at a lower level in the room, which is obtained by subtracting the temperature TL from the temperature TLC. The next Step S014 judges whether the temperature difference ΔTL is positive or negative. When the temperature difference ΔTL is negative (the temperature TL detected by the second temperature detection element 6 is higher than the new second set room temperature TLC), the process proceeds to a Step S015 which carries out a slow air-feeding operation wherein the outlet area of the outlet port is widened and the air volume from the outlet port is decreased. Conversely, when the temperature difference ΔTL is positive (the temperature TL detected by the second temperature detection element 6 is lower than the new second set room temperature TLC), the process proceeds to a Step S016 which carries out a fast air-feeding operation wherein the outlet area at the outlet port is narrowed and the air volume from the outlet port is increased.

Figure 3:
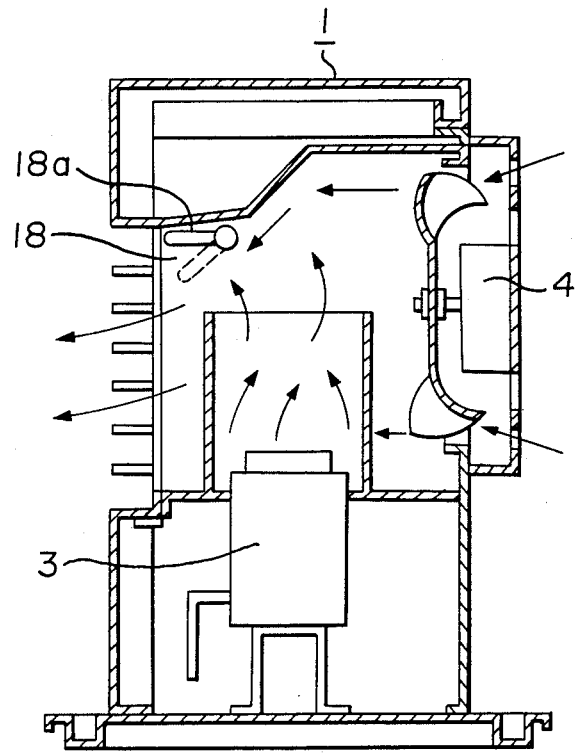
FIG. 3 is a vertical cross-sectional view of an embodiment of the heater.

In FIG. 3, there is shown a vertical cross section view of the heater. The slow air-feeding operation wherein the outlet area is widened is that a vane 18a of the outlet area changing device 18 arranged in the outlet port is shifted to a position indicated in solid line. The slow air-feeding operation wherein the outlet area is narrowed is that the vane 18a is shifted to a position indicated in dotted line. The shift of the vane 18a is carried out by use of an electric motor and so on. The shift of the vane 18a causes the outlet area to change.

Figure 4:
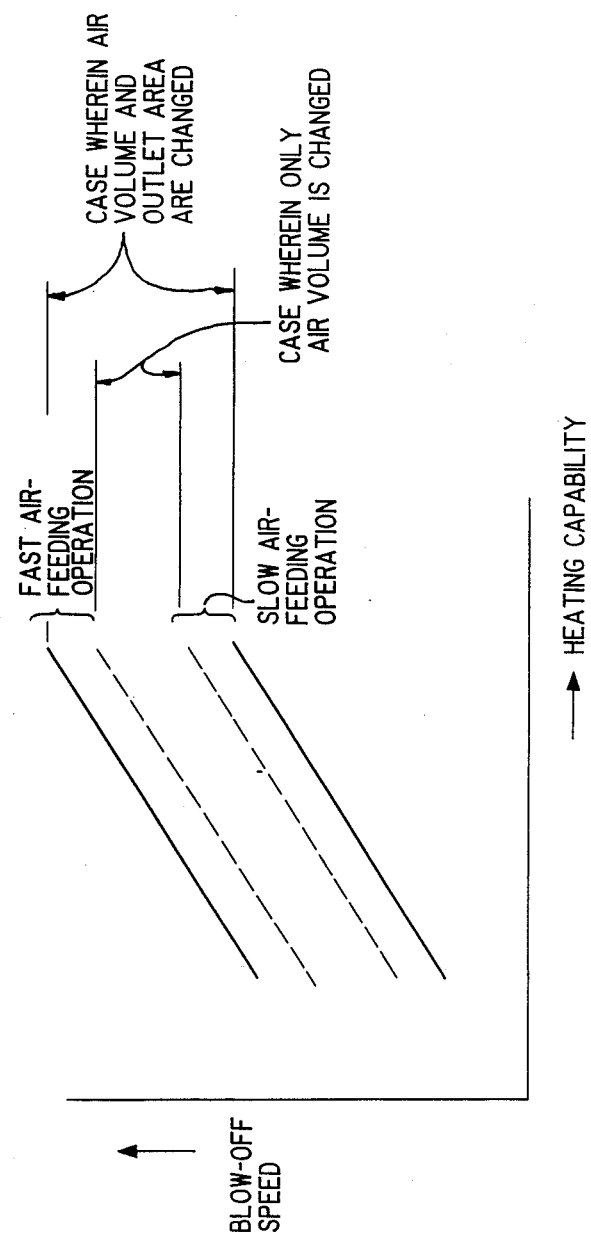
FIG. 4 is a graphical representation showing air feed characteristics of the embodiment.

In FIG. 4, there is shown a graphical representation showing the characteristics of the blow off speed of the heated air. When the outlet area is kept constant, the heating capability and the air volume have such relation that as the heating capability decreases, the air volume decreases and that as the heating capability increases, the air volume increases. In a fast air-feeding operation indicated in dotted line in FIG. 4, the air volume is made a little greater. Although the capability of forming desired temperature conditions in the room is improved, the capability is not sufficient. In the fast air-feeding operation indicated in solid line, the air volume is made a little greater, and the outlet area is narrowed. This allows the blow off speed to be significantly increased, the capability of forming the desired temperature conditions in the room to become sufficient, and variation in the temperature distribution in the room in the vertical direction to be minimized. In this way, the temperature conditions given by the heater in the room are greatly improved, promoting comfortability. In the slow air-feeding operation as shown in FIG. 4, the air volume become a little smaller, and the outlet area is widened. As a result, the noise in the room is reduced, forming of uncomfortable air flow is greatly minimized, and comfortability is improved.

Figure 5:
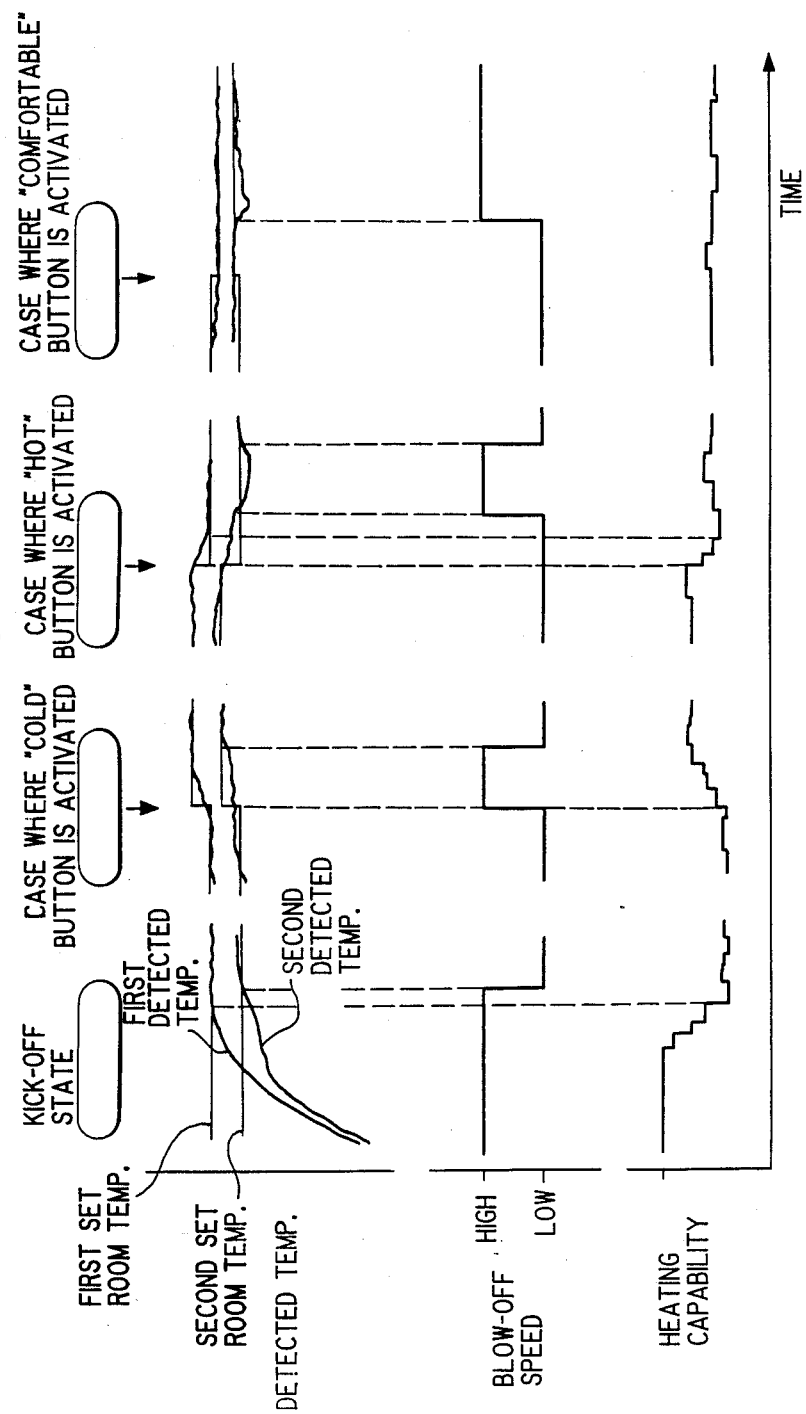
FIG. 5 is a schematic diagram explaining the operation of the embodiment.

The operation state of the heater having the construction as stated above will be explained in reference to FIG. 5. FIG. 5 is a graphical representation showing the change in room temperature, the blow off speed from the outlet port and the heating capability when the heating operation is carried out in accordance with the embodiment as described above. In FIG. 5, there are shown a kick-off state, a case where the "cold" button is actuated, a case where the "hot" button is actuated, and a case where the "comfortable" button is actuated. In the kick-off state, the heating operation starts targetting the first set temperature and the second set temperature which have been stored in the memory 13 before shipment when the user uses the heater 1 for the first time, or the first set temperature and the second set temperature which have been stored in the memory 13, respectively, in the same values as the temperature detected by the first and second temperature detection elements 5 and 6 when the "comfortable" button 20 has been actuated at the time of the previous heating operation. In this state, the fast air-feeding operation wherein the air volume is increased and the outlet area is narrowed is carried out because the second set room temperature is lower than the first set room temperature. In order to increase the room temperature rapidly, this fast air-feeding operation is preferable. When the temperature detected by the first temperature detection element 5 comes close to the first set room temperature, the heating capability control device 15 decreases the heating capability so as to make the temperature detected by the first temperature detection element correspond to the first set room temperature. On the other hand, when the temperature detected by the second temperature detection element reaches the set room temperature as shown in FIG. 5 after the temperature detected by the second temperature detection element has gradually risen, the slow air feeding operation wherein the air blower control device 16 decreases the air volume and the outlet area control device 17 widens the outlet area is carried out. When the temperature detected by the second temperature detection element has not reached the second set room temperature depending on the temperature outside or other condition, the fast air-feeding operation is continued. If the temperature detected by the second temperature detection element becomes higher than the second set room temperature, the slow air-feeding operation is continued.

In the slow air-feeding operation, when the user actuates the "cold" button, the first set room temperature is reset to a new first set room temperature which is higher than the temperature detected by the first temperature detection element 5 by e.g. 2° C., and the second set room temperature is reset to a new second set room temperature which is obtained based on the new first set room temperature and the temperature difference b between the previous first set room temperature and the previous second set room temperature. As a result, the temperature difference between the temperature detected by the first temperature detection element 5 and the new first set room temperature becomes larger, and the heating capability control device 15 increases the heating capability. In addition, the temperature difference between the temperature detected by the second temperature detection element 6 and the new second set room temperature also becomes larger, and the air blower control device 16 and the outlet area control device 17 function to carry out the fast air-feeding operation. After that, the temperatures detected by both temperature detection elements 5 and 6 increase, and the operation similar to that in the kick-off state is carried out.

In the slow air-feeding operation, when the user actuates the "hot" button, the first set room temperature is reset to a new first set room temperature which is lower than the temperature detected by the first temperature detection element 5 by e.g. 2° C., and the second set room temperature is reset to a new second set room temperature which is obtained based on the new first set room temperature and the temperature difference b between the previous first set room temperature and the previous second set room temperature. As a result, the temperature detected by the first temperature detection element 5 becomes higher than the new first set room temperature, and the heating capability control device 15 decreases the heating capability or stop the operation of the heater 1. In this way, the temperature detected by the first temperature detection element 5 becomes closer to the new first set room temperature. In this time, the slow air feeding operation is continued because the temperature detected by the second room temperature detection element 6 becomes higher than the new second set room temperature. When the "hot" button is actuated under the fast air-feeding operation, the fast air-feeding operation is immediately shifted to the slow air-feeding operation. When the temperature detected by the second temperature detection element 6 becomes lower than the new second set room temperature depending on the temperature outside or other conditions after the slow air-feeding operation as started, the slow air-feeding operation is shifted to the fast air-feeding operation. After that, when the temperature detected by the second temperature detection element 6 becomes equal to the new second set room temperature, the fast air-feeding operation is returned to the slow air feeding operation.

Under the slow air feeding operation, when the user actuates the "comfortable" button, the first set room temperature and the second set room temperature are reset to the temperature detected by the first temperature detection element 5 and the temperature detected by the second temperature detection element 6 at that time, respectively. At the same time, the temperature difference b is reset to a new one which is obtained based on the new first set room temperature and the new second set room temperature. When the "comfortable" button is actuated, the heating capability, the air volume and the outlet area are not changed. After that, the air heating capability, the air volume and the outlet area are controlled targetting the temperature difference between the upper level and lower level in the room at that time, thereby to maintain the temperature conditions similar to that obtained when the "comfortable" button was actuated.

Figure 6:
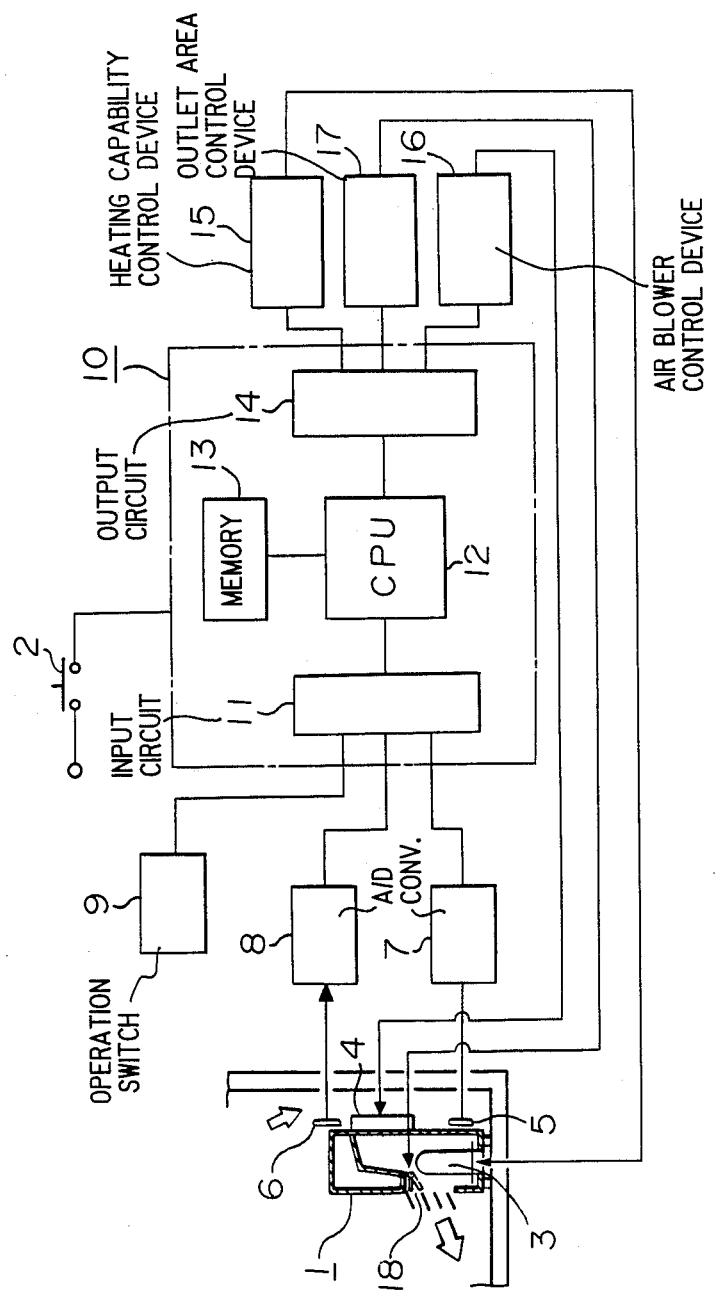
FIG. 6 is a schematic diagram of another embodiment of the heater according to the present invention.
Figure 7:
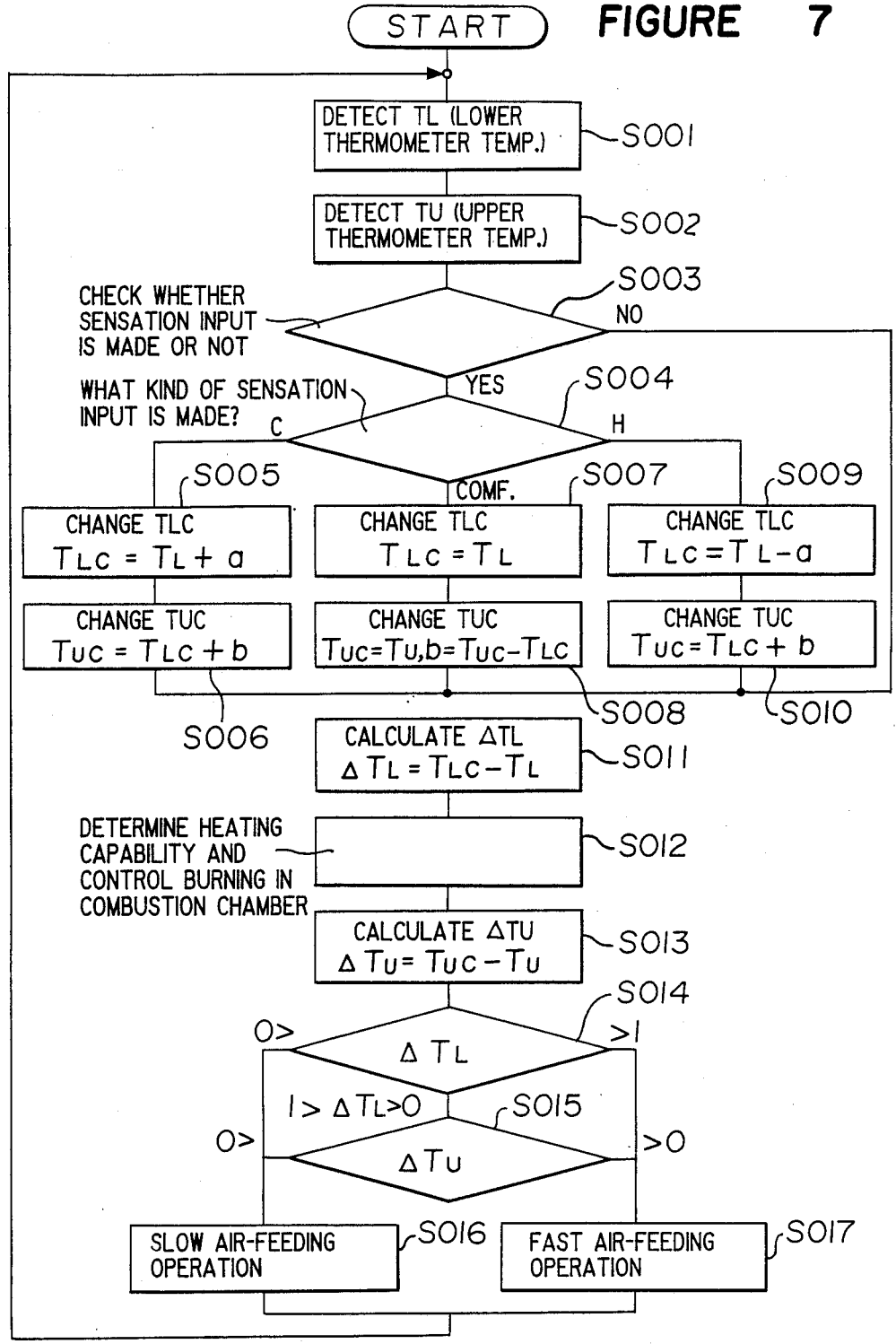
FIG. 7 is a flow chart showing the control process carried out in the electrical circuit of FIG. 6.

Now, another embodiment of the present invention will be described in reference to FIG. 6 showing a schematic view of the electrical circuit of this embodiment, and FIG. 7 showing a flow chart of the control process of this embodiment. This embodiment is different from the first embodiment in that the first temperature detection element 5 is mounted on a lower portion of the heater 1 and the second temperature detection element 6 is mounted on an upper portion of the heater 1 as shown in FIG. 6. As shown in FIG. 7, the control process of this embodiment is a little complicated in comparison with the control process of FIG. 2 because the heating operation is controlled based on the temperature detected by the first temperature detection element 5 which is representative of the temperature at a lower level in the room. This embodiment can offer advantages similar to the first embodiment.

The operation of this embodiment will be explain in reference to FIG. 7.

First, when the main switch 2 is turned on, the flow shown in FIG. 7 starts, targetting the first set temperature TLC and the second set temperature TUC which have been stored in the memory 13 before shipment when the user uses the heater 1 for the first time, or the first set temperature TLC and the second set temperature TUC which have been stored in the memory 13, respectively, in the same values as the temperatures detected by the first and second temperature detection elements 5 and 6 when the "comfortable" button has been actuated at the time of the previous heating operation. A Step S001 detects the temperature TL at the lower level of the heater 1 by the first temperature detection element 5. The next Step S002 detects the temperature TU at the upper level of the heater 1 by the second temperature detection element 6. The next Step S003 checks whether the sensation input is made or not. When the sensation input is made, the process proceeds to a Step S004. The Step S004 through a Step S010 are a flow as the set room temperature determining means. When the sensation input is not made at the Step S003, the flow from the Step S004 through the Step S010 are skipped, and the process proceeds to a flow starting from a Step S011 as the heating capability determining means and the air volume determining means. The Step S004 judges what kind of sensation input is made. When the user feels the room temperature at that time is cold and actuates the "cold" button, the next Step S005 resets the first set room temperature to a new first set room temperature TLC which is higher than the first detected temperature TL by a° C. (e.g. 2° C.). The next Step S006 resets the second set room temperature to a new second set room temperature TUC which is obtained by adding the temperature difference b between the previous first set room temperature and the previous second set room temperature to the new first set room temperature TLC. When the user actuates the "comfortable" button, the Step S007 resets the first set room temperature to a new first set room temperature TLC which is equal to the first detected temperature TL at that time. The Step S008 resets the second set room temperature to a new second set room temperature TUC which is equal to the second detected temperature TU at that time, and also resets the temperature difference b between the previous first set room temperature and the previous second set room temperature to a new temperature difference b which is obtained by substracting the new first set room temperature TLC from the new second set room temperature UTC. When the user actuates the "hot" button, the Step S009 resets the first set room temperature to a new first set room temperature TLC which is lower than the first detected temperature TL at that time by a° C. (e.g. 2° C.). The next Step S010 resets the second set room temperature to a new second set room temperature TUC which is obtained by adding the temperature difference b between the previous first set room temperature and the previous second set room temperature to the new first set room temperature TLC. The Step S011 calculates $\Delta TL$ which is obtained by substracting the first detected temperature TL representative of the temperature at a lower level in the room from the new first set room temperature TLC. The next Step S012 determines the heating capability based on the calculated $\Delta TL$ and controls burning in the combustion chamber in an adequate manner. The next Step S013 calculates the temperature difference $\Delta TU$ which is obtained by substracting the second detected temperature TU representative of the temperature at an upper level in the room from the new second set room temperature TUC. The next Step S014 makes a comparison between the first detected temperature TL and the new first set room temperature TLC. When the first detected temperature TL is higher than the new first set room temperature TLC, i.e. the inequality, $\Delta TL<0$, is satisfied, the process proceeds to a Step S016 where the slow air feeding operation wherein the outlet area is widened and the air volume is decreased is carried out. When the first detected temperature TL is lower than the new first set room temperature TLC by e.g. 1° C. or more, i.e. the inequality, $\Delta TL>1$, is satisfied, the process proceeds to a Step S017 where the fast air-feeding operation wherein the outlet area is narrowed and the air volume is increased is carried out. When the first detected temperature TL is lower than the new first set room temperature TLC by a value below e.g. 1° C., i.e. the inequality, $0<\Delta TL<1$, is satisfied, the process proceeds to a Step S015 which judges whether the temperature difference $\Delta TU$ between the second detected temperature TU and the new second set room temperature TUC which is obtained by substracting the former from the latter is positive or negative. When the second detected temperature TU is higher than the new second set room temperature TUC (the temperature difference $\Delta TU$ is negative), the process proceeds to the Step S016 where the slow air feeding operation is carried out. Conversely, when the second detected temperature TU is lower than the new second set room temperature TUC (the temperature difference $\Delta TU$ is positive), the process proceeds to the Step S017 where the fast air-feeding operation is carried out. The slow air-feeding operation and the fast air-feeding operation are carried out in manners similar to those as be explained on the first embodiment in reference to FIGS. 3 and 4.

Figure 8:
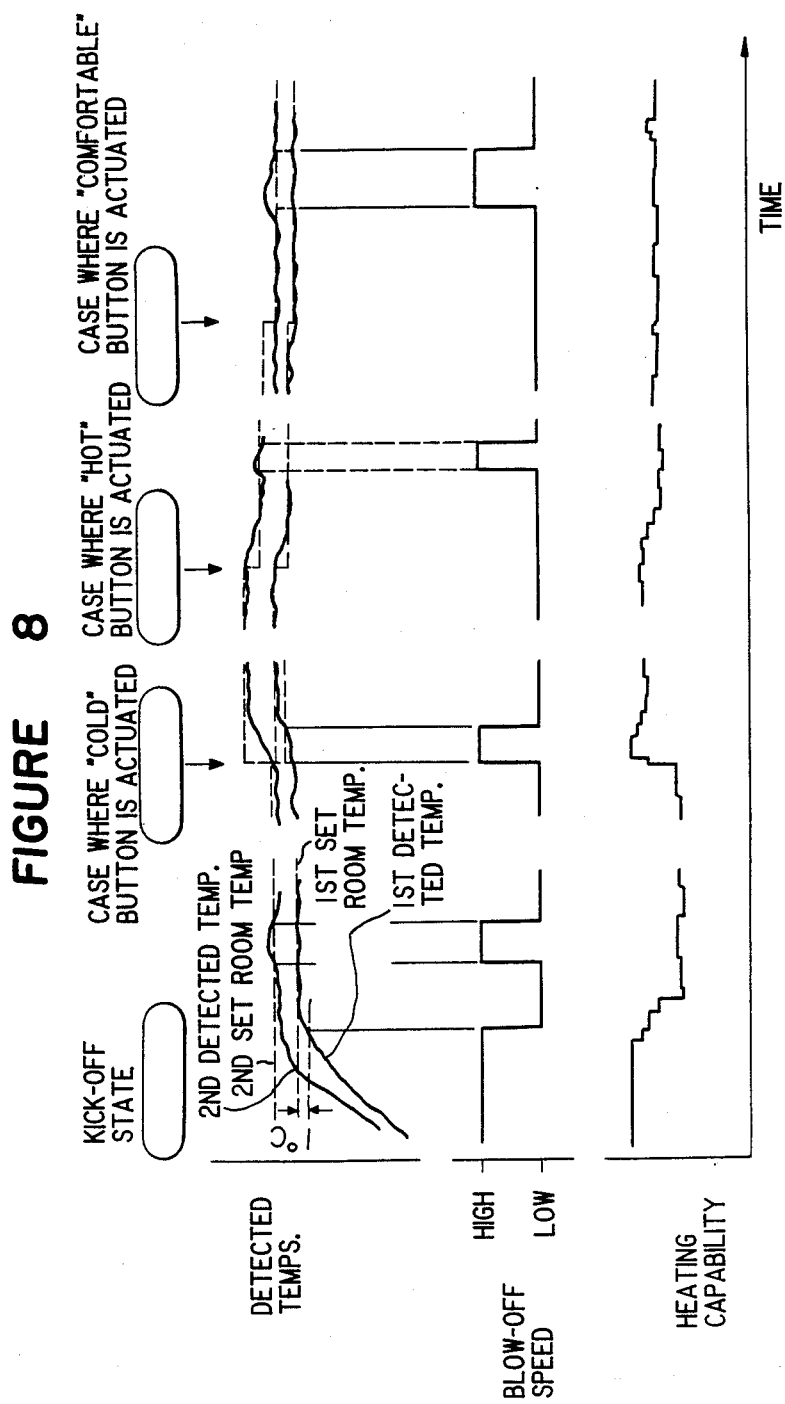
FIG. 8 is a schematic diagram explaining the operation according to the control process of FIG. 7.
Figure 9:
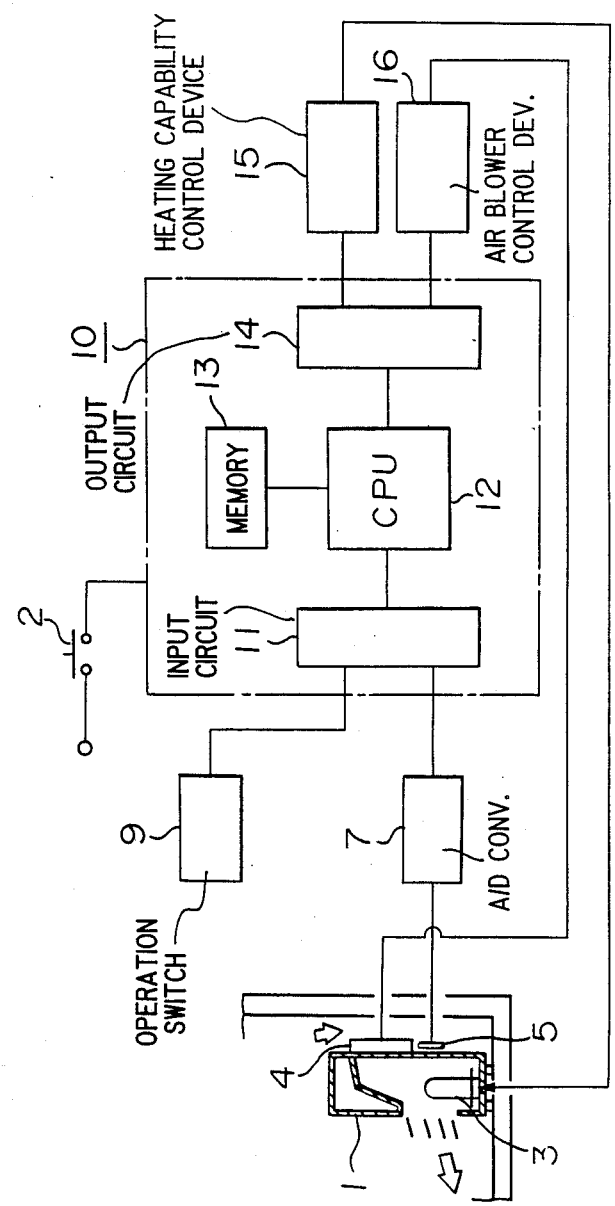
FIG. 9 is a schematic diagram of the electrical circuit of the conventional heater.
Figure 10:
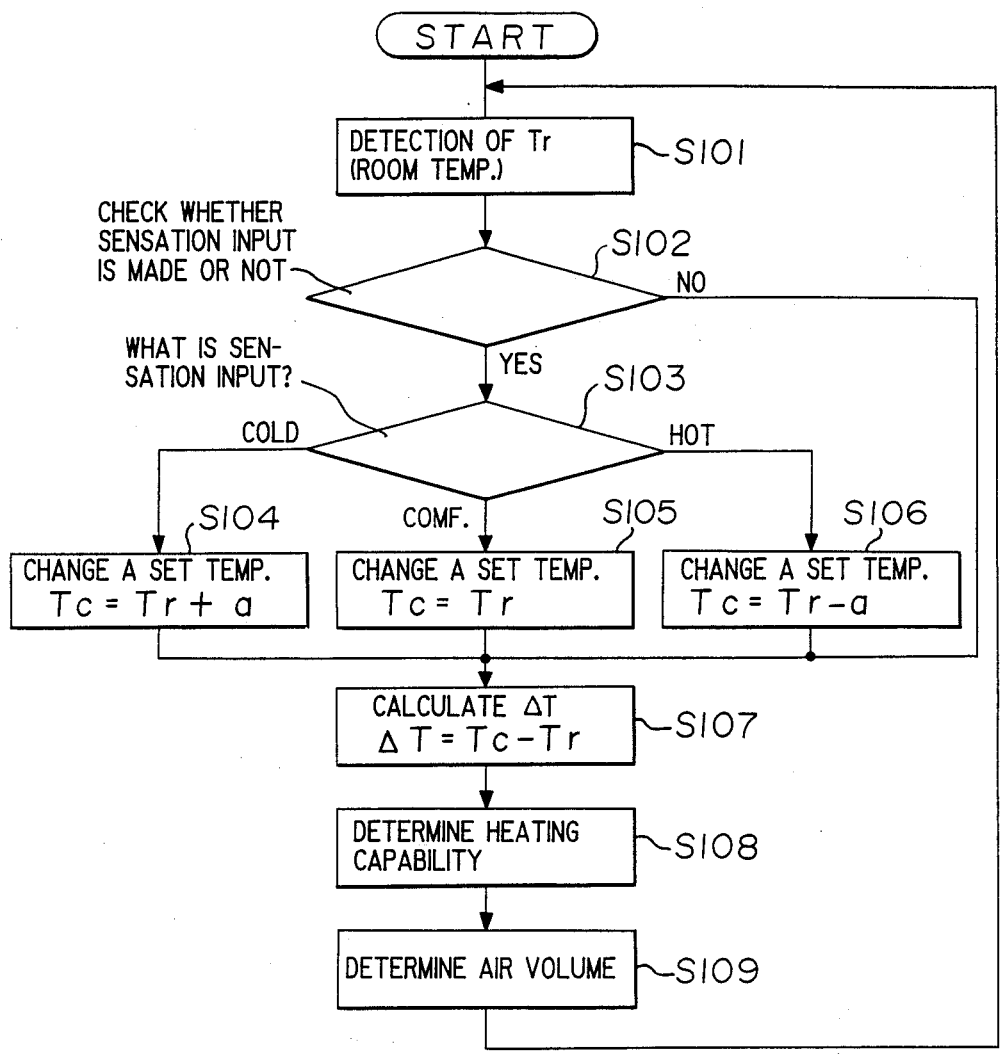
FIG. 10 is a flow chart showing the control process carried out in the electrical circuit of FIG. 9.
Figure 11:
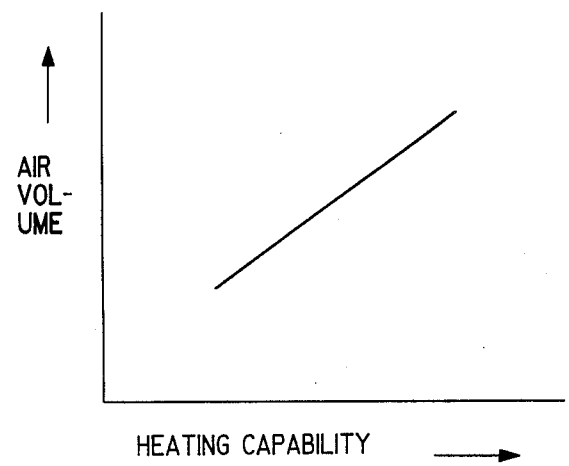
FIG. 11 is a graphical representation showing air feed characteristics of the conventional heater.

Now, the operation state of the second embodiment will be explained in reference to FIG. 8. In FIG. 8, there are graphical representations showing changes in the room temperature, the blow-off speed and the heating capability when the heating operation is performed in accordance with the second embodiment.

Under the kick-off state, the heating operation is targetting the first set temperature and the second set temperature which have been stored in the memory 13 before shipment when the user uses the heater 1 for the first time, or the first set temperature and the second set temperature which have been stored in the memory 13, respectively, in the same values as the temperatures detected by the first and second temperature detection elements 5 and 6 when the "comfortable" button 20 has been actuated at the time of the previous heating operation. At this time, the fast air-feeding operation wherein the air volume is increased and the outlet area is narrowed is carried out because the first detected temperature is lower than the first set room temperature by 1° C. or above. In order to increase the room temperature rapidly, this fast air-feeding operation is preferable. When the first detected temperature becomes closer to the first set room temperature, the heating capability control device 15 decreases the heating capability. Even if the difference between the first detected temperature and the first set room temperature becomes lower than 1° C. in a case wherein the second detected temperature is lower than the second set room temperature, the air blower control device 16 and the outlet area control device 17 carry out the fast air-feeding operation wherein the air volume is great and the outlet area is narrow. The fast air-feeding operation is continued until the second detected temperature reaches the second set room temperature. When the second detected temperature becomes higher than the second set room temperature, the slow air feeding operation starts. After that, when the second detected temperature becomes lower than the second set room temperature, the slow air-feeding operation is shifted to the fast air-feeding operation.

Under the slow air feeding operation, when the user actuates the "cold" switch, the first set room temperature is reset to a new first set room temperature which is higher than the first detected temperature by e.g. 2° C. The second set room temperature is reset to a new second set room temperature which is obtained by adding the temperature difference b between the previous first set room temperature and the previous second set room temperature to the new first set room temperature. As a result, the temperature difference between the first detected temperature and the new first set room temperature becomes larger, and the heating capability control device 15 increases the heating capability. When the first detected temperature becomes lower than the new first set room temperature by 1° C. or above, the air blower control device 16 and the outlet area control device 17 function to carry out the fast air-feeding operation. After that, the first and second detected temperatures are rising in manners similar to those under the kick-off state.

Under the slow air-feeding operation, when the user actuates the "hot" button, the first set room temperature is reset to a new first set room temperature which is lower than the first detected temperature by e.g. 2° C., and the second set room temperature is reset to a new second set room temperature which is obtained by adding the temperature difference b between the previous first set room temperature and the previous second set room temperature to the new first set room temperature. As a result, the first detected temperature becomes higher than the new first set room temperature, and the heating capability control device 15 decreases the heating output or stops the operation of the heater 1. In this way, the first detected temperature approaches the new first set room temperature. When the first detected temperature becomes higher than the new first set room temperature, the slow air feeding operation is continued. When the "hot" button is actuated under the first air feeding operation, the operation is immediately shifted to the slow air-feeding operation. When the second detected temperature becomes lower than the new second set room temperature depending on the temperature outside or other condition after the slow air-feeding operation has started, the operation is returned to the fast air-feeding operation. And, the operation is returned to the slow air feeding operation when the second detected temperature becomes higher than the new second set room temperature.

Under the slow air-feeding operation, when the user actuates the "comfortable" button, the first set room temperature and the second set room temperature are reset to the first detected temperature and the second detected temperature at that time, respectively. In addition, the temperature difference b between the previous first set room temperature and the previous second set room temperature is reset to a new one which is obtained by substracting the new first set room temperature from the new second set room temperature. At that time, the heating capability, the air volume and the outlet area are not changed. After that, the heating capability, the air volume and the outlet area will be set targetting the temperature difference in the vertical direction in the room at that time. In this way, the temperature conditions which were obtained when the "comfortable" button was actuated can be maintained.

By the way, both embodiments change both outlet area and air volume of the heated air between the fast air-feeding operation and the slow air-feeding operation in order to equalize the vertical temperature distribution in the room. As shown in FIG. 4, either the outlet area or the air volume can be changed to obtain similar advantage. In detail, in FIG. 1, the output of the air blower control device 16 can be kept constant, and the output of the outlet area control device 17 can be used to operate the outlet area changing device 18 for changing the blow off speed of the heater. Or, the output of the outlet area control device 17 can be kept constant, and the output of the air blower control device 16 can be used to change the revolution of the air blower 4 for changing the air volume of the heated air.

Although in the first and second embodiments the air volume and the outlet area are controlled in two steps, respectively, they can be controlled in more multiple steps. The heating capability can be invariable. The heat source for obtaining the heated air is not restricted to a case wherein kerosene is burnt as fuel like the embodiments. The heat source is variable or modified within the spirit of the present invention (e.g. an electric heating type, a refrigerating cycle).

Obviously, numerous modifications and variations of the present invention are possible in light of the above teachings. It is therefore to be understood that within the scope of the appended claims, the invention may be practiced otherwise than as specifically described herein.

What is claimed is:

1. A heater comprising
a heater body containing a heating source;
an air blower for forcibly blowing off heated air from the heater body into a room, the heated air being produced by heat-exchanging with the heating source;
a first temperature detection element for detecting a temperature at an upper level in the room;
a second temperature detection element for detecting a temperature at a lower level in the room;
a sensation input means for enabling a user to input his or her sensation corresponding to an actual room temperature;
means for determining heating output of the heating source based on the difference between the temperature detected by the first temperature detection element and a first set temperature;
means for changing the outlet area of the heated air based on the difference between the temperature detected by the second temperature detection element and a second set temperature lower than the first set temperature to determine the blow-off speed of the heated air; and
a control means for changing the first set temperature and the second set temperature based on the input given through the sensation input means.

2. A heater according to claim 1, wherein the first temperature detection element is arranged at an upper portion of the heater body and the second temperature detection element is arranged at a lower portion of the heater body.

3. A heater comprising:
a heater body containing a heating source;
an air blower for forcibly blowing off heated air from the heater body into a room, the heated air being produced by heat-exchanging with the heating source;
a first temperature detecting element for detecting a temperature at a lower level in the room;
a second temperature detection element for detecting a temperature at an upper level in the room;
a sensation input means for enabling a user to input his or her sensation corresponding to an actual room temperature;
means for determining heating output of the heating source based on the difference between the temperature detected by the first temperature detection element and a first set temperature;
means for determining the blow-off speed of the heated air blown off by the air blower based on the temperature detected by the first temperature detection element, the first set temperature, the temperature detected by the second temperature detection element and a second set temperature higher than the first set temperature thereby to match the second set temperature to the output of the second temperature detection element; and
a control means for changing the first set temperature and the second set temperature based on the input given through the sensation input means.

4. A heater according to claim 3, wherein the first temperature detection element is arranged at a lower portion of the heater body and the second temperature detection element is arranged at an upper portion of the heater body.

5. A heater comprising:

a heater body containing a heating source;

an air blower for forcibly blowing off heated air from the heater body into a room, the heated air being produced by heat-exchanging with the heating source;

a first temperature detection element for detectioning a temperature at a lower level in the room;

a second temperature detection element for detectioning a temperature at an upper level in the room;

a sensation input means for enabling a user to input his or her sensation corresponding to an actual room temperature;

means for determining heating output of the heating source based on the difference between the temperature detected by the first temperature detection element and a first set temperature;

means for carrying out a fast air-feeding operation wherein the heated air is fed in a high speed blow-off by changing the outlet area and the air volume of it when the temperature detected by the first temperature detection element is lower than the first set temperature by a predetermined value;

means for carrying out the fast air-feeding operation when the temperature detected by the first temperature detection element is lower than the first set temperature, the difference between both temperatures is in a predetermined range, and the temperature detected by the second detection temperature is lower than a second set temperature;

means for carrying out a slow air-feeding operation wherein the heated air is fed in a low speed blow-off by changing the outlet area and air volume of the heated air when the temperature detected by the first temperature detection element is lower than the first set temperature, the difference between both temperatures is in a predetermined range and the temperature detected by the second temperature detection element is higher than the second set temperature;

means for carrying out the slow air-feeding operation when the temperature detected by the first temperature detection element is higher than the first set temperature; and a control means for changing the first set temperature and the second set temperature based on the input given through the sensation input means.

6. A heater according to claim 1, wherein the first temperature detection element is arranged at a lower portion of the heater body and the second temperature detection element is arranged at an upper portion of the heater body.

* * * * *